April 28, 1959 C. P. FISHER 2,884,498

ELECTRO MAGNETIC DEVICES

Filed Oct. 19, 1953 5 Sheets-Sheet 1

INVENTOR.
CHARLES P. FISHER
BY
Moses, Nolte, Crews & Berry
ATTORNEYS

April 28, 1959 C. P. FISHER 2,884,498

ELECTRO MAGNETIC DEVICES

Filed Oct. 19, 1953 5 Sheets-Sheet 2

INVENTOR.
CHARLES P. FISHER
BY
Moses, Nolte, Crews & Berry
ATTORNEYS

April 28, 1959 C. P. FISHER 2,884,498

ELECTRO MAGNETIC DEVICES

Filed Oct. 19, 1953 5 Sheets-Sheet 3

INVENTOR.
CHARLES P. FISHER
BY
Moses, Nolte, Crews & Berry
ATTORNEYS

INVENTOR.
CHARLES P. FISHER
BY
Moses, Nolte, Crews & Berry
ATTORNEYS

ELECTRO MAGNETIC DEVICES

INVENTOR.
CHARLES P. FISHER
BY
Moses, Nolte, Crews & Berry
ATTORNEYS

United States Patent Office 2,884,498
Patented Apr. 28, 1959

2,884,498

ELECTRO MAGNETIC DEVICES

Charles P. Fisher, Framingham, Mass., assignor to Sigma Instruments, Incorporated, a corporation of Massachusetts Application October 19, 1953, Serial No. 386,981

20 Claims. (Cl. 200—93)

This invention relates to electromagnetic devices and particularly to sensitive electromagnetic control devices such as sensitive relays. While some features of the invention are useful in connection with nonpolarized devices, other features are particularly applicable to polarized systems.

In general the objects of invention comprise the provision of an electromagnetic device of the character described which shall be very compact in design, easy to manufacture by mass production methods, capable of being quickly and accurately assembled, and in which the necessary adjustments required are few and can be easily made by adjusting means all of which are in readily accessible position.

It is also an object of the invention to make a relay structure in which all parts are firmly supported and properly balanced so that the relay may operate in any position and be substantially free from effects of gravity, acceleration, ambient temperature changes, and other conditions which might affect reliability of operation.

Another object of the invention is the provision of a structure including improved magnetic circuits in which maximum efficiency is obtained and flux leakages are reduced to a minimum. In this way a device can be made which is extremely sensitive to small changes of current and in which the sizes of coils and of the permanent magnets are reduced to the smallest practicable dimensions.

Another object of the invention is the provision of a movable armature and switch assembly which can be assembled as a unit separate from the magnet unit assembly, and applied to or removed from the magnet assembly in a very simple manner without requiring any dismantling of either of the separable units. This permits great versatility in the application of the device to different classes of service, as different sub-assemblies may be brought together, thereby producing an electromagnetic device suitable for a wide range of uses without requiring the entire structure or design to be made over. For example, a standard type of armature mounting and armature contact mechanism may be assembled with a different form of magnet assembly. Also when the units are separated, either the switch assembly or the magnet assembly may be readily changed in important particulars. For example, if the switch assembly as a whole is separated from the magnet assembly, the latter may be readily changed to incorporate coils having different characteristics suitable for another type of work.

Another object of the invention is to provide a novel form of movable armature mounting in which the armature is supported on a spring, without movable pivots, or the like, and in which the spring tension may be varied so as to change the operating characteristics of the instrument, and in which the armature may be adjusted to a centrally balanced position or may be biased to be side-stable in either direction. By the use of the adjustable restoring spring, the ratio of force to armature stroke can be varied within wide limits, and the desired operation secured without necessitating use of adjustable air gaps or of means for changing the characteristics of the magnetic circuit. By using magnets of reduced strength so as to make the armature center-stable, the device can be made to perform as an electromagnetic resonator with very high selectivity. The construction also lends itself to reduction of the force to mass ratio in the armature to the lowest value, so that a device is produced of the highest sensitivity and capable of operation at very high speeds.

Other and more specific objects of the invention will appear in connection with the description of one particular embodiment of the invention in the form of a sensitive polarized relay which is shown and described in detail for the purpose of illustrating the principles of the invention.

In the accompanying drawings illustrating such preferred embodiment of the invention;

Figures 1, 2, 3:
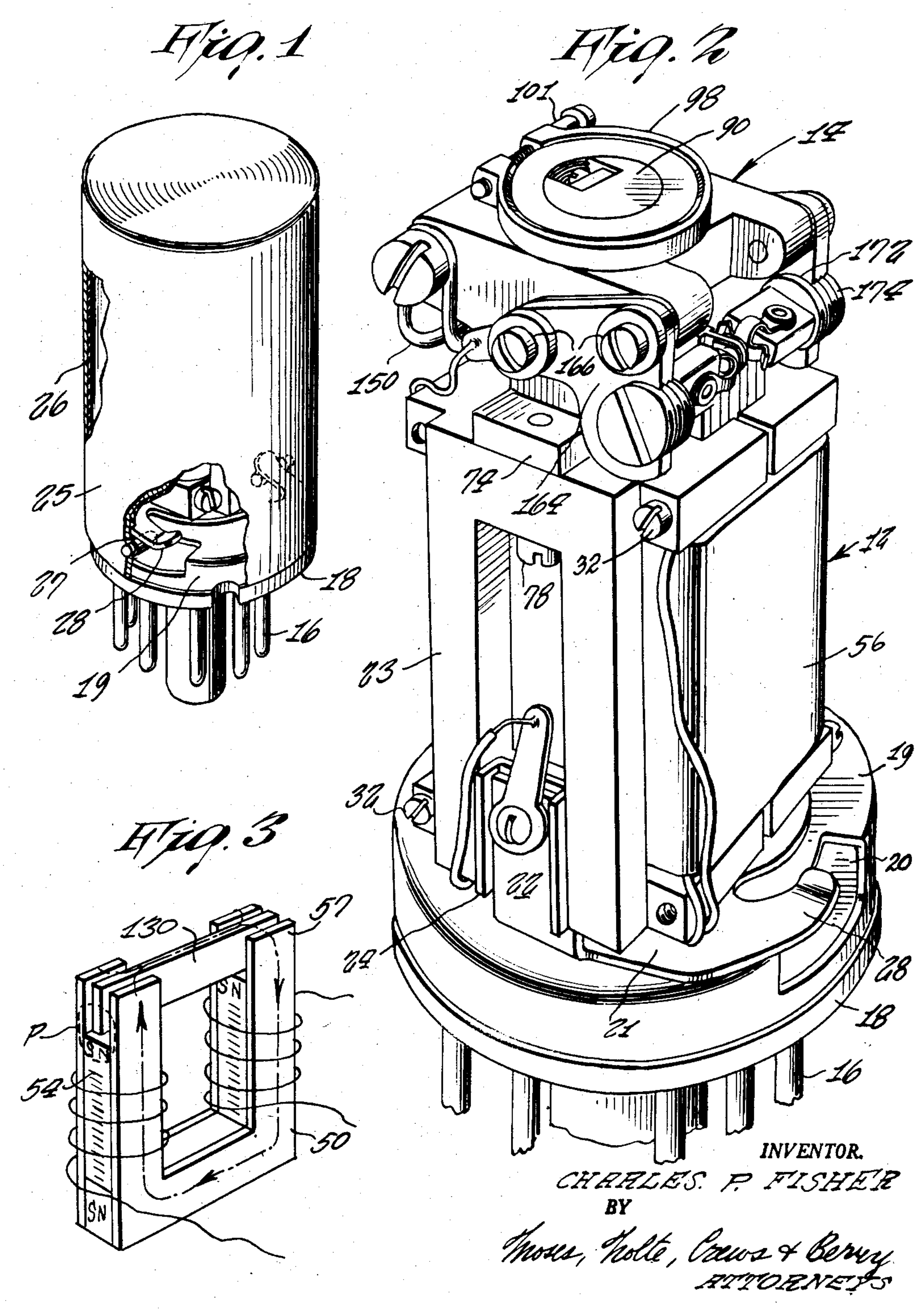
Figure 1 is a perspective view showing a relay mounted on an insulating base carrying the terminal pins, the relay being enclosed in a shell, a part of which is shown broken away.
Figure 2 is a perspective view of the relay on an enlarged scale with the shell removed.
Figure 3 is a diagrammatic perspective view showing the magnetic circuit.

Referring to the drawings in detail, the particular embodiment of the invention illustrated is a sensitive relay. It comprises a magnet and coil unit 12 and an armature and contact carrying unit 14, which are secured together and may conveniently be mounted on a base provided in the usual manner with terminal pins 16. The base illustrated comprises an insulated lower part 18 in which the terminal pins are mounted, and a metallic cup-shaped portion 19 secured thereto so as to enclose a space 20. Mounted on the part 19 is a plate 21 having upturned ears 22 at its ends to which are secured the frame members 23 carrying the coils. The frame members 23 are insulated from the ears 22 by insulation 24. The wires from the terminal pins 16 pass up through the space 20 to the coils and contacts. The construction is arranged to be enclosed if desired within a shell 25 which may or may not be hermetically sealed. The shell is preferably provided with an insulating lining 26. The shell may be secured to the base in any suitable manner, as by means of pins 27 extending through slots in the member 19 and snapping under spring fingers 29 formed on the plate 21 when the shell is slightly rotated.

The magnet and coil unit and the armature and contact carrying unit are preferably made as separate assemblies which are firmly attached during use, but which may be readily separated for adjustment or repair. This arrangement of separate units facilitates assembly and it also permits replacement or substitution of components, so that the operative characteristics of the construction may be readily changed as by using coils of different resistances, magnets of different strengths, springs having different characteristics, various arrangements of contacts, etc.

Referring first to the magnet and coil unit 12, this comprises a frame formed of two preferably identical castings or stampings 23 of nonmagnetic material, such for example as aluminum, magnesium or brass. The two frame members may be clamped together by means of screws 32, and each comprises a side plate having an opening 36 therein and having an upper head 38 provided with legs 40 and with an upper plane surface 42. A screw hole 44 is formed through each upper head. The plate 34 also has a lower head 46 provided with legs 48. A magnet assembly is mounted and clamped between the frame members 23.

Figure 10:
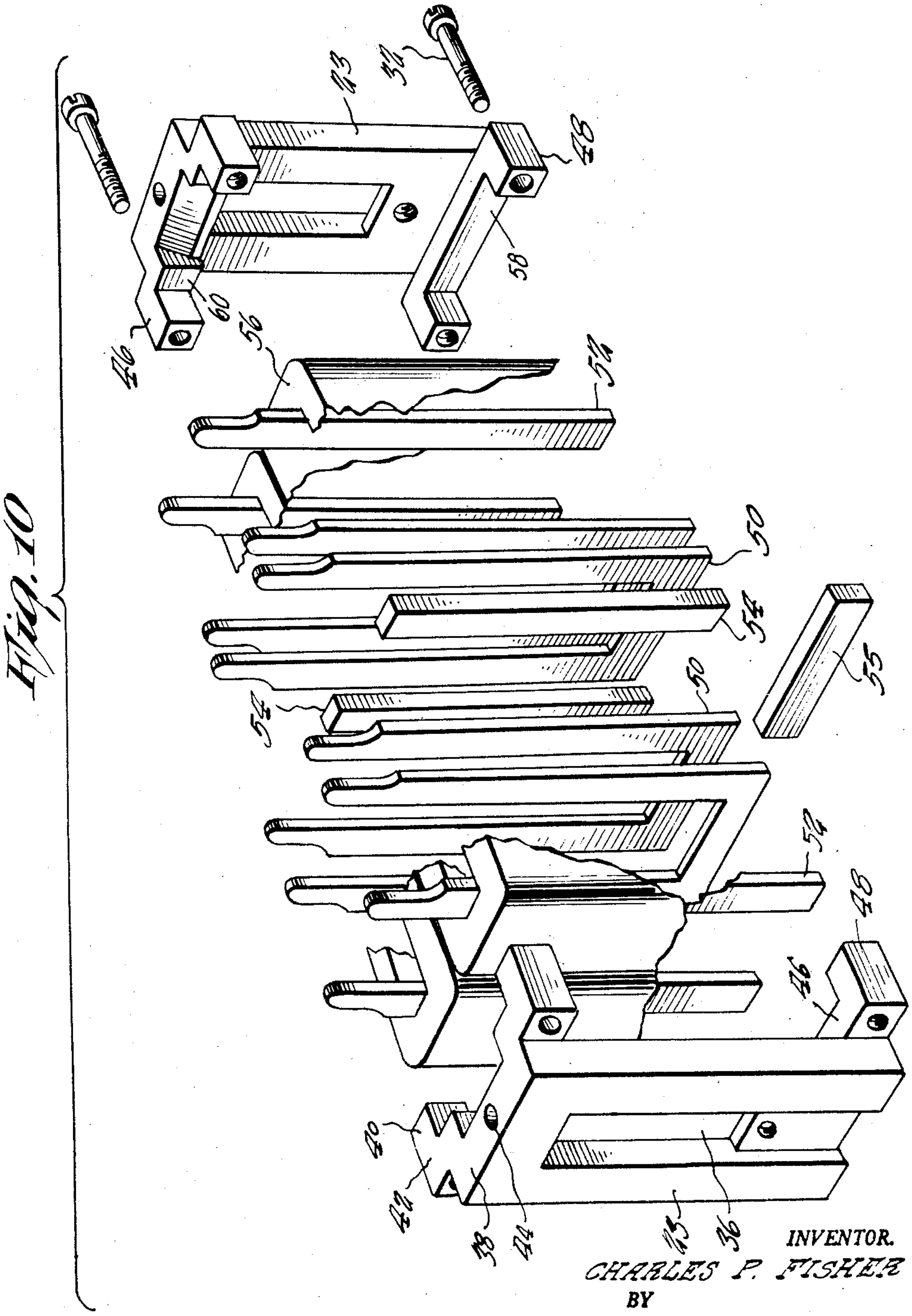
Figure 10 is an exploded view showing the parts constituting the magnet and coil unit.

Referring more particularly to Fig. 10, this magnet assembly comprises a plurality of soft iron yokes 50, fitting against the upright limbs of which are the soft iron lamination plates 52. The plates 52 may be made integral with the yokes 50, or the yokes 50 may be made of a thickness equal to the combined thickness of the yokes, as shown, and of the lamination plates, but it is more desirable to make the lamination plates of separate pieces, both to secure the merits of lamination and for the reason that by using sections of relatively thin metal they may be more easily punched to shape. Any desired number of lamination plates may be used. Mounted between the respective sets of yokes and lamination plates are permanent magnets 54 which are made of a very retentive magnetic material of high coercive strength. A suitable material for this purpose is that known commercially as "Alnico 12." Any other material having the desired magnetic retentivity may be used. A magnetic piece 55 may be mounted transversely across the lower ends of the magnets, if desired. Mounted on the limbs formed by the vertical members of the yokes, lamination plates and magnets are the coils 56, which fit between the side plates of the frame and the top and bottom heads 38 and 46 and the legs 40 and 48. They may project laterally between the legs 40 and 48, as shown in Fig. 2, if desired. The parts described are assembled by clamping the frame members together by means of the screws 32.

Figures 6, 7, 8:
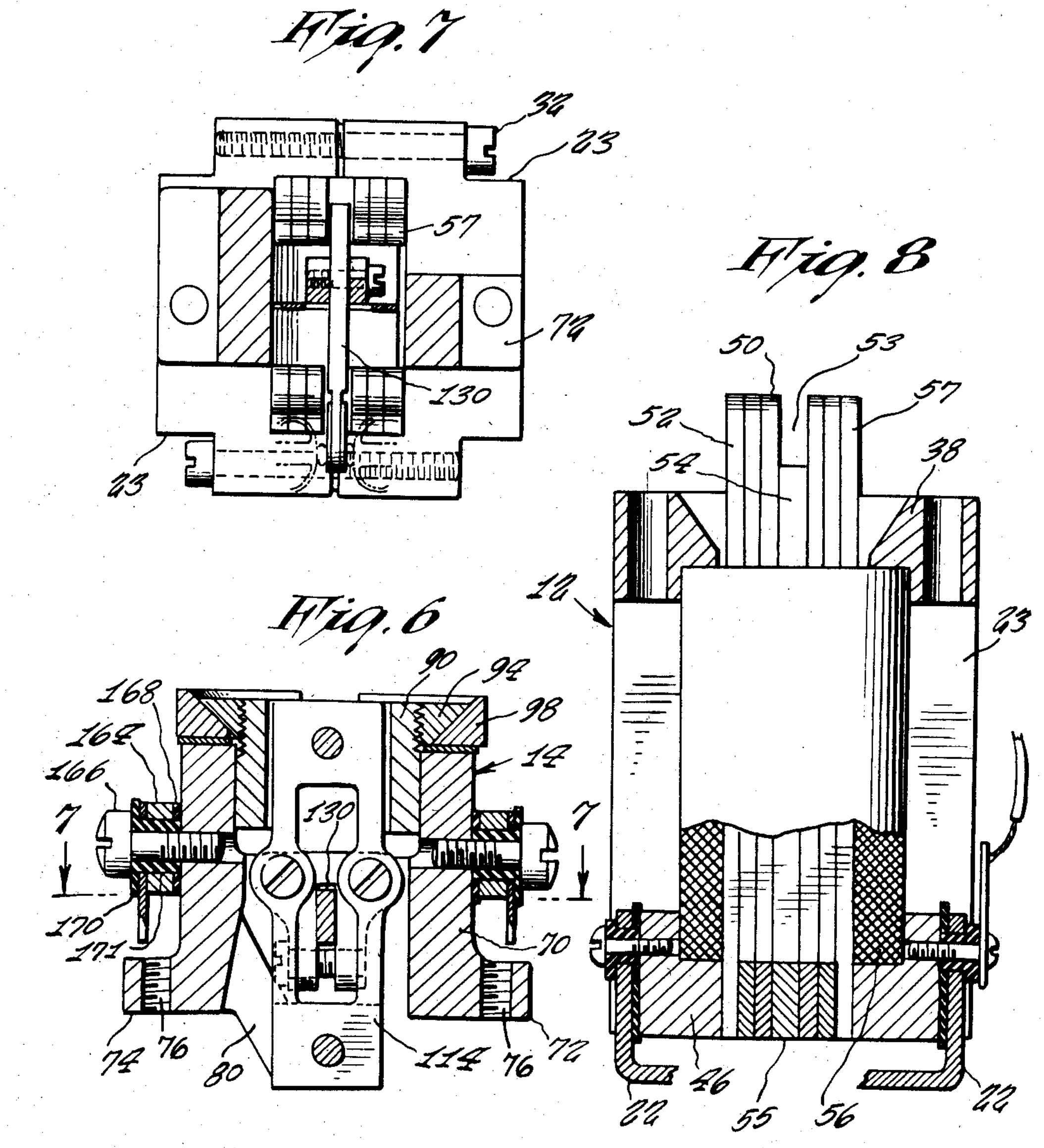
Figure 6 is a vertical sectional view of the armature carrying unit taken on line 6—6 of Fig. 4.
Figure 7 is a horizontal sectional view on the line 7—7 of Fig. 6.
Figure 8 is a vertical sectional view of the magnet and coil unit taken on line 8—8 of Fig. 4, the base being broken away.

The lower ends of the yokes 50 and of the lamination plates 52 and magnets 54 all extend at the bottom of the assembly between the legs 48 and fit the rectangular opening in the bottom heads enclosed by such legs, the outer surfaces of the yokes being engaged by the surfaces 58 of the lower heads. At the upper ends the yokes project upwardly through the opening in the upper head members between the spacing legs 40, and the upper ends of the lamination plates similarly project. The magnets 54 are shorter than the limbs of the yokes so that spaces or air gaps 53 are left between the latter above the ends of the magnets (Fig. 8). The projecting upper ends of the yokes are engaged by the surfaces 60 of the upper heads so that when the screws 32 are tightened up, the metal core formation, comprising the yokes, lamination plates and permanent magnets, is solidly and immovably clamped together. The coils 56 are arranged to slip easily over the side limbs of the yokes and are firmly retained in position by engagement therewith, and by being received between the end heads and legs on the frame members. However, the core members and magnets described are firmly clamped in position by the heads of the frame members irrespective of the coils. Obviously various coils of different characteristics may be readily substituted in the assembly by separating the frame members and replacing the coils on the core members.

The upper projecting ends of the yokes and lamination plates constitute four upwardly projecting pole pieces 57, as clearly shown in Fig. 8. These pole pieces are accurately spaced by the magnet bars 54 which are ground to accurate dimensions and so produce air gaps 53 of exact and uniform width. The magnets 54 are magnetized transversely, so that one face of each magnet is a north face and the other face is a south face. Two north faces are used at the same sides of the air gaps. By choosing magnets of right thickness, the desired air gap width is provided.

The armature and contact unit 14 includes a frame 70, preferably in the form of a casting of nonmagnetic material such as aluminum, magnesium or brass, and which is provided with a pair of supporting ears 72 and 74, each provided with a threaded hole 76. These ears are adapted to seat on the faces 42 of the magnet frame members, and to be clamped firmly thereon by suitable means such as the screws 78 which are passed upwardly through the holes 44 and screwed into the holes 76 in the ears 72 and 74. The holes 44 are preferably made somewhat larger than the screws, so that a slight adjustment of the position of the upper frame 70 upon the magnet frame is possible. Projecting from the lower part of the frame 70 and diagonally from below the ear 74 is a bracket 80 having a vertical slot 82 therein and having a transverse hole 84 extending through the same. This bracket 80 passes between the upwardly projecting limbs of the yokes and the lamination pieces at one side of the magnet assembly.

Figure 5:
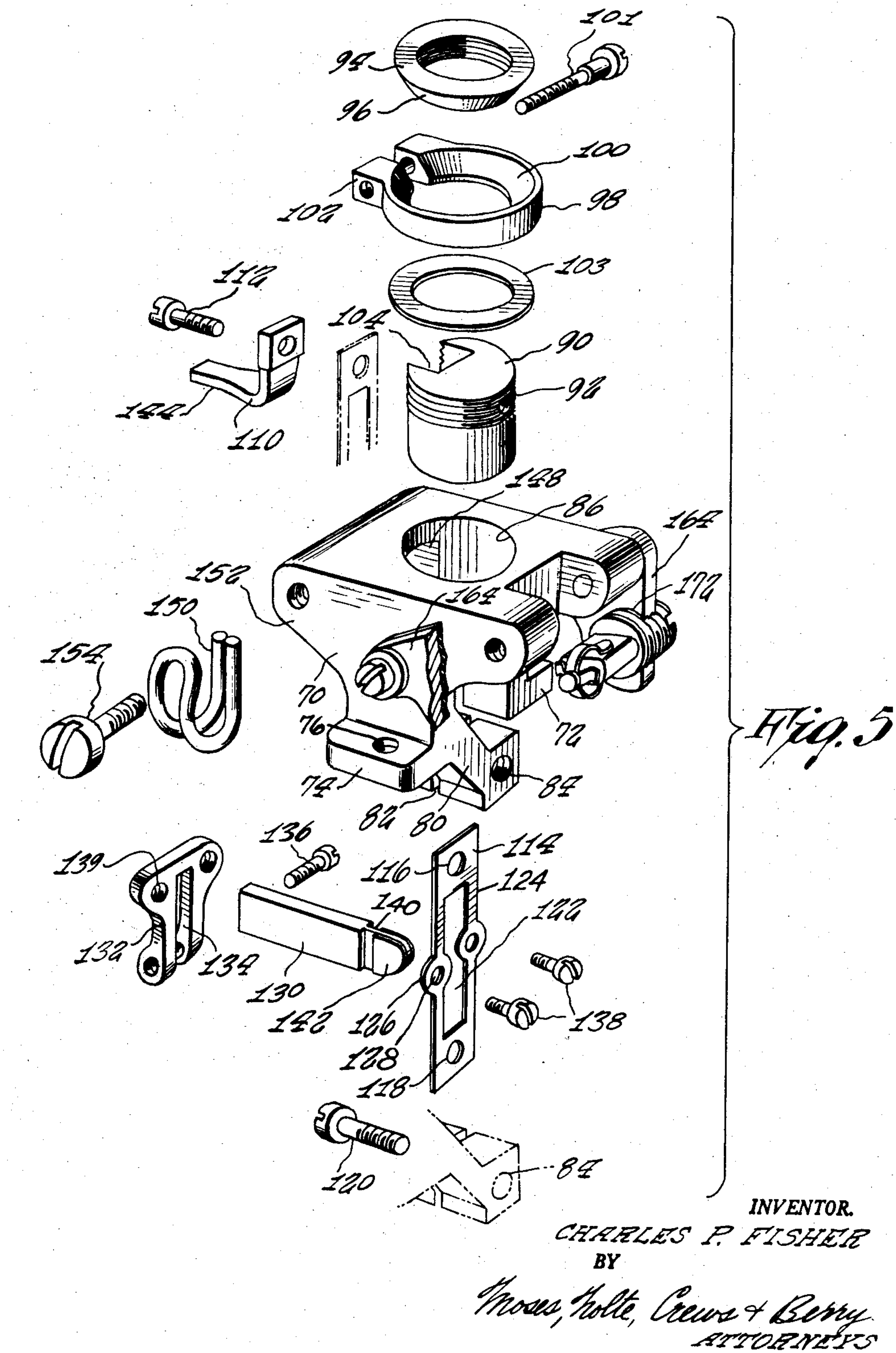
Figure 5 is an exploded view in perspective showing the frame of the armature carrying unit, and showing the principal parts which are to be assembled therewith.

Extending vertically through the frame 70 is a bore 86 (Fig. 5). Sliding in the bore 86 is a plug 90 which has a fine screw thread 92 at the upper part thereof. This is engaged by a nut 94 which is provided with a beveled lower face 96. Under this nut is mounted a split ring 98 having a beveled face 100 matching the beveled face 96 on the nut. The split ring may be adjusted in size by means of a screw 101 engaging lugs 102 on the ring, thereby raising or lowering the nut and plug. The lower face of the ring bears on a washer 103 which loosely surrounds the plug 90 and rests on the top face of the frame 70. Vertical adjustment of the plug in the bore 86 may therefore be roughly approximated by positioning the nut 94 on the thread 92 and then may be adjusted with great precision by turning the screw 101. The plug 90 is provided with an angular recess in one side thereof as indicated at 104. A clamping bracket 110 is fitted in the recess and drawn towards the back thereof by screw 112.

Clamped between the back of the recess and the bracket 110 is the upper end of an armature pivot spring 114. This is provided with a hole 116 (Fig. 5) through which the screw 112 is passed, and at its lower end is provided with a hole 118. The lower end of the spring is placed in the slot 82 in the bracket 80 and a clamping screw 120 is passed through the hole 84 in the bracket and the hole 118 in the spring and firmly clamps the lower end of the spring in the bracket 80. The spring 114 preferably is provided with a central elongated slot 122 so that the spring comprises two spaced vertical armature supporting limbs 124. Each limb of the spring is also preferably provided with an enlargement 126 having a perforation 128 therethrough. The armature 130 is passed through the slot 122 and is secured to the spring by any suitable means, such as a bifurcated bracket 132 having a slot 134 therein within which the armature is removably clamped by a screw 136. The bracket is secured to the enlarged portions 126 of the spring by screws 138, which are passed through the holes 128 and screwed into threaded holes 139 in the bracket 132. The armature may be removed and replaced by loosening the screw 136, without removal of the spring 114. The spring 114 is tensioned to the desired extent by tightening or loosening the beveled ring 98, which, through its engagement with the beveled nut 94, effects endwise adjustment of the plug 90 without applying any rotational movement thereto. Increasing the tension on the spring increases the resistance to torsion and vice versa, so that the torsional spring serves both as a pivot support for the amature and as a biasing spring tending to hold or return it to a desired position. The adjustability of the tension and thereby of the biasing force is very important in enabling the action of the armature to be varied to suit the precise conditions of use. The tension spring mounting of the armature is very firm and durable and permits of very high speed operation for long periods of time. There is nothing to wear or get loose, no friction and a minimum of inertia to be overcome.

It will be observed that in the preferred construction illustrated the plane of the torsion spring 114 is transverse to the longitudinal axis of the armature 130. As the spring has much greater stiffness against bending transversely in the plane of the spring than in a direction at right angles to such plane, it will be seen that bodily lateral movement of the armature in the gaps between the pole pieces will be firmly resisted. Such bodily lateral movement as distinct from normal pivotal or differential movement produces electrical and magnetic bias which effects correct operation of the device. Direction of lower stiffness lengthwise of the armature is relatively unimportant; displacement in this direction does not alter relation of gaps to armature and condition of torsion. The proportion of stressed spring material to armature mass is very high, ensuring survival of very high shocks.

The armature 130 has a suitable operating formation at one end, such for instance as the blade portion 140 which is shown as having a contact 142 on each face thereof. Obviously this feature can be varied depending upon the use to which the relay is to be put. When the armature carrying unit 14 is assembled on the magnet unit 12, it will be seen that the ends of the armature extend between the pairs of pole pieces 57.

Figure 4:
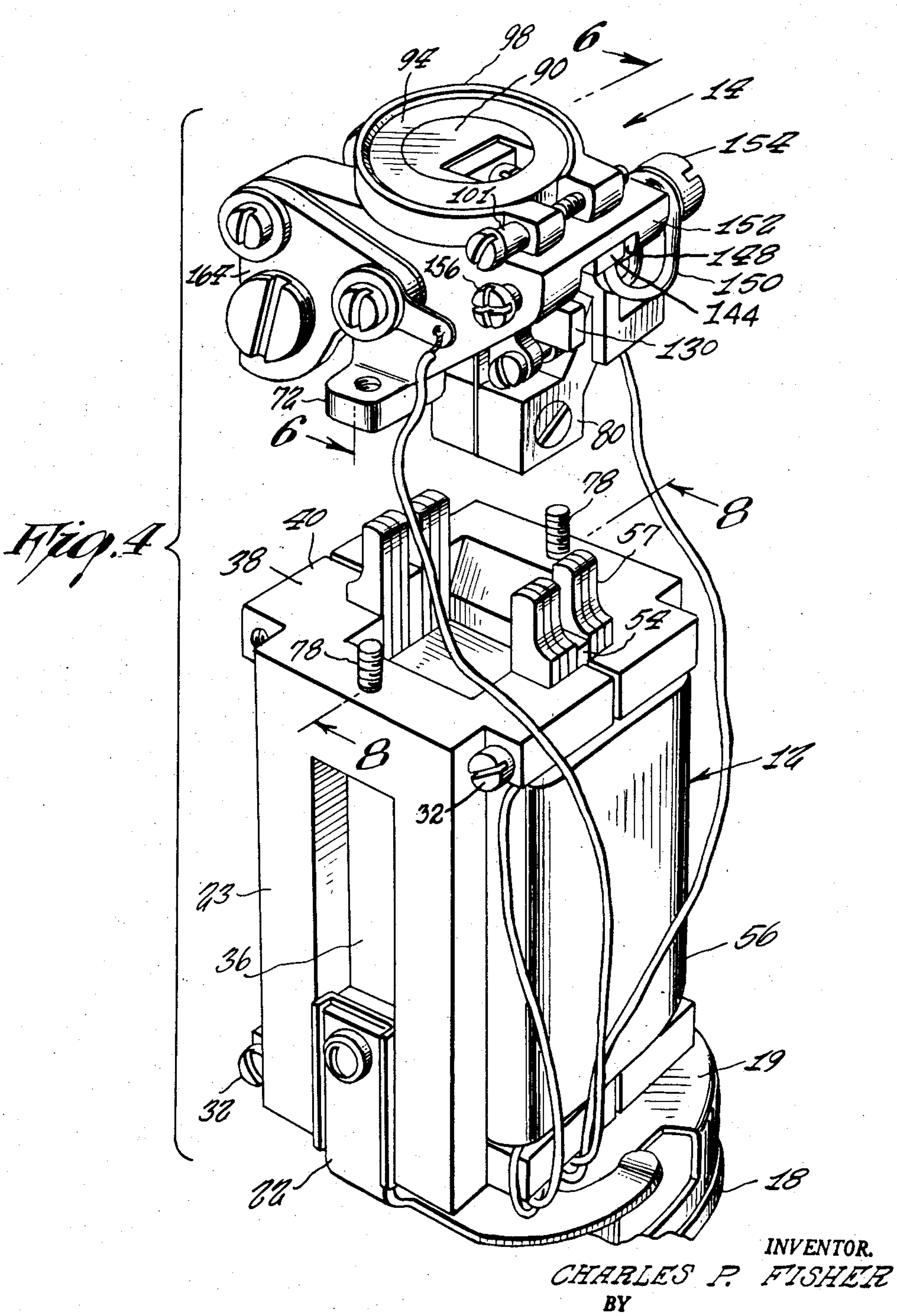
Figure 4 is a perspective view of the relay showing the armature carrying unit separated from the magnet and coil unit.

An adjustment is preferably provided whereby the spring 114 may be given a neutral setting, or an initial biasing position or twist. Such an adjustment permits the armature to be set so as to be either balanced in a central position when no current is applied, or to be side-stable to the right or left. The adjustment means shown makes use of an outwardly projecting arm 144 of the bracket 110, this arm projecting through the wide slot 148 at the side of the bore 86. The outer end of the arm 144, as shown in Figs. 4 and 5, is engaged by adjusting means such as the spring 150 clamped to an ear 152 on the frame 70 by a screw 154, the other side of the arm 144 being engaged by an adjusting screw 156. By turning the screw 156 one way or the other it is seen that the arm 144 can be moved thereby turning slightly the plug 90 and the upper end of the spring 114 clamped thereto.

Figure 9:
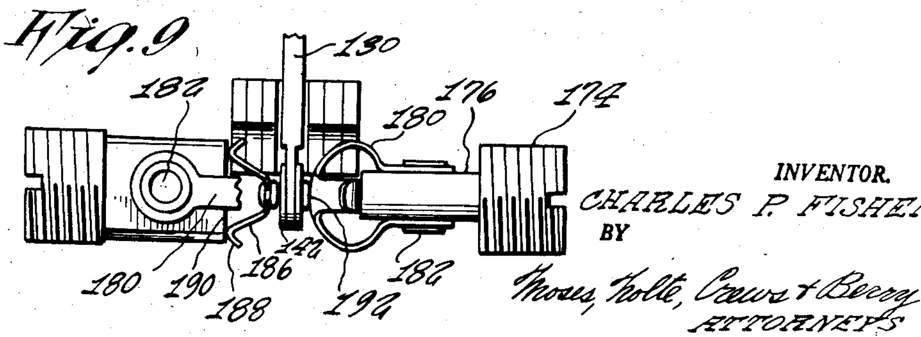
Figure 9 is a plan view showing the end of the armature and contact construction on an enlarged scale, parts being shown in section.

The character of the fixed contacts for cooperation with the contacts on the armature may be selected depending upon the service to be performed by the relay. In the construction illustrated a pair of frictionally damped spring contacts is provided. As shown particularly in Figs. 2, 6 and 9, contact carrying brackets 164 are clamped to the frame by screws 166, the brackets being insulated from the frame by insulation pieces 168, and insulation washers 170 having necks 171. The brackets 164 have threaded recesses 172 therein which are preferably not completely closed, so that the sides of the recess may be sprung together slightly so as to hold firmly screw plugs 174 screwed therein. The screw plugs 174 have flat-sided bodies 176, over which spring loops 180 are secured by screws or rivets 182. The spring loops 180 carry bow shaped damper springs 186, the ends 188 of which are reversely curved and bear against the faces 190 of the bodies 176. The damper springs 186 are preferably made integral with the spring loops 180 or may be secured thereto in any suitable manner. Contact faces 192, formed of platinum, tungsten or other resistant metal suited for engagement by the armature contacts 142 are applied to the springs 186. This construction of contact, while not essential is advantageous as the two symmetrically placed free ends of the bow spring 186 provide a double frictional damping effect without causing lateral displacement of the contact faces 192 with respect to the armature contacts, so that there is no wiping at such contacts.

It will be seen that all the adjustments required for initial setting or subsequent changing of the relay characteristics can be made by means of instrumentalities exposed at the top of the relay which are at all times readily accessible by simply removing the outer shell from the relay, if such a shell is used. No displacement of the coils or any interference with the lead wires thereto is necessary. The whole armature and contact unit 14 can also be entirely removed for replacement, cleaning or adjustment by simply removing the two screws 78. This permits different arrangements of armature and contacts to be substituted with the greatest ease, so as to adapt the relay for the particular service to which it is to be put. It is also easy to replace the coils 56 by simply taking off the top unit and separating the frame members 23. By loosening the screws 78 slightly, the top unit may be moved on the top face of the frame sufficiently to properly position the armature initially with respect to the pole pieces. Once this initial adjustment is secured the screws 78 are tightened up and any further adjustment can be carried out by the various adjustment devices above described.

The arrangement of the magnetic circuits is shown diagrammatically in Fig. 3. It will be seen that the pole pieces 57 forming the upper projecting ends of the yokes 50 (of which the plates 52 may be considered a part) extend upwardly above the ends of the permanent magnets 54. The armature 130 is suspended to vibrate immediately above the ends of the permanent magnets and between these pole pieces. There are in effect two separate polarizing magnetic circuits each formed by the permanent magnetic flux flowing from one pole piece through the adjacent end of the armature to the opposite pole piece at the same end. There is thus substantially no polarizing flux passing lengthwise of the armature, and the greater part of the length of the armature is therefore entirely unaffected by such flux, so that the armature section and mass can be as small as electrically induced flux requirements allow. This polarizing flux path is indicated in a general way by broken line P.

The variable electromagnetic flux produced by the coils travels through the U-shaped yokes and the path for such flux is completed through the length of the armature. As the armature is usually substantially unsaturated, this circuit is able to respond to very small changes in flux resulting from very weak currents in the coils. The variable flux set up by the coils is, however, sufficient to unbalance the system by increasing the total flux operating, for example, in the counter-clockwise direction, and decreasing the total flux operating in the clockwise direction. This, of course, will result in the swinging of the armature in the usual manner. In effect the flux operating in one direction at each end of the armature is equal to the sum of one-half the permanent magnet flux plus one-half of the coil flux $$\frac{\phi_p+\phi_c}{2}$$

while the flux operating in the opposite direction at each end of the armature is equal to $$\frac{\phi_p-\phi_c}{2}$$

The arrangement of the four pole pieces and the permanent magnets at the ends of the armature is extremely compact so that practically all of the permanent magnet flux is effective and there is slight opportunity for leakage. The same is true of the coil induced flux. The ends of the armature move directly over and fairly close to the effective ends of the permanent magnets so any leakage therefrom would go directly into the armature. The arrangement of the two coils on the vertical limbs of the yokes is very convenient from a manufacturing point of view, as these coils can simply be slipped down over the limbs of the yokes. The arrangement is also very effective electrically, as the coils can be readily changed and may, when desired, be directly coupled, so that they produce the effect of a single coil. Under certain conditions, however, the coils may be connected so as to respond to separate factors.

The mounting of the armature in the air gaps which are open at the top and so that the armature will vibrate about an axis parallel with the longitudinal axes of the limbs of the yokes, makes possible the use of an armature mounting such that the armature may be withdrawn directly from the end of the magnetic structure without dismounting the armature. This makes possible the use of the removable armature and switch unit with the advantages already set forth, and this is accomplished without any loss of magnetic efficiency.

The mounting of the permanent magnets in the core structure upon which the coils are located is very advantageous as giving simplicity and compactness of design, and in making a structure in which leakage losses are minimized. The construction also facilitates the mounting of the armature as part of a separate and easily removable unit as described above.

While I have illustrated and described in detail one preferred form of my invention, it is to be understood that changes may be made therein and the invention embodied in other structures. I do not therefore, desire to limit myself to the specific construction illustrated, but intend to cover my invention broadly in whatever form its principles may be embodied.

What I claim is:

1. In a polarized electromagnetic device, an armature mounted for vibration about a medial axis, two pairs of pole pieces, one pair being mounted on opposite sides of one end of the armature and the other pair being mounted on opposite sides of the other end of the armature, the pole pieces on one side of the armature being connected through a low reluctance magnetic path and the pole pieces on the other side of the armature being connected through a low reluctance magnetic path, means for causing control fluxes to flow through both of said low reluctance paths and armature from one end to the other of the latter, and stationary magnetic means associated with said pole pieces and constructed and arranged to produce positive polarity in both of said pole pieces at one side of the armature and negative polarity in both pole pieces at the other side of the armature for causing polarizing fluxes to flow transversely through the ends of the armature from the pole pieces on one side of the armature to the adjacent pole pieces on the other side of the armature.

2. A polarized electromagnetic device as claimed in claim 1 in which the means for mounting the armature comprises a torsion spring held under longitudinal tension, said spring having much greater stiffness against bending on one transverse axis than on a transverse axis at right angles thereto, the armature being attached to the torsion spring between the ends thereof with the longitudinal axis of the armature at right angles to the transverse spring axis of greater stiffness.

3. A construction as claimed in claim 2 in which the torsion spring is formed of flat sheet metal, the longitudinal axis of the armature being transverse to the plane of the spring.

4. A polarized electromagnetic device as claimed in claim 1 in which the means for mounting the armature comprises a torsion spring, and means for rotatably mounting an end thereof so as to permit adjustment of the bias of said spring and armature towards one or the other pole piece of each pair.

5. In an electromagnetic device, a pair of flat U-shaped yokes of magnetic material mounted in spaced parallel relationship, the free ends of the limbs of the yokes constituting two pairs of spaced pole pieces, means for producing a variable magnetic flux through said yokes, an armature having its opposite ends located between the pole pieces of said respective pairs of pole pieces, and means for pivotally mounting said armature for vibration about an axis located between said pairs of pole pieces and parallel with the axes of the limbs of said yokes.

6. A construction as claimed in claim 5 in which the means for pivotally mounting the armature comprises a flat torsion spring extending parallel with the axes of the yoke limbs.

7. A construction as claimed in claim 6 in which the torsion spring is formed of flat sheet metal, the longitudinal axis of the armature being transverse to the plane of the spring.

8. A construction as claimed in claim 5 in which the means for pivotally mounting the armature comprises a flat torsion spring extending parallel with the axes of the yoke limbs, said spring being provided with a central longitudinal slot so as to provide two spaced spring limbs, said armture passing transversely between said spring limbs and being secured thereto, and means for adjustably tensioning said spring in the direction of its axis.

9. In an electromagnetic device, a pair of yokes of magnetic material mounted in parallel spaced relationship, the ends of the limbs of the yokes constituting two pairs of spaced pole pieces, coil means for producing a variable magnetic flux through said yokes, an armature having its opposite ends located between the pole pieces of said respective pairs of pole pieces, means for pivotally mounting said armature for vibration about an axis located between said pole pieces and parallel with the axes of the limbs of said yokes, said pivotal mounting comprising a torsion spring parallel with the longitudinal axes of said yoke limbs, a support for each end of said spring, said armature being secured to said spring at an intermediate point between said supports, and means for adjusting the distance between said supports so as to vary the tension on said torsion spring.

10. In an electromagnetic device, a pair of yokes of magnetic material mounted in parallel spaced relationship, the ends of the limbs of the yokes constituting two pairs of spaced pole pieces, coil means for producing a variable magnetic flux through said yokes, an armature having its opposite ends located between the pole pieces of said respective pairs of pole pieces, and means for pivotally mounting said armature for vibration about an axis located between said pairs of pole pieces and parallel with the axes of the limbs of said yokes, said pivotal mounting comprising a torsion spring in the form of an elongated flat strip parallel with the longitudinal axis of the yoke limbs, a support for each end of said spring, said armature being secured to said spring at an intermediate point between said supports, one of said supports comprising a plug, means for turning said plug about its axis so as to bias the spring, and means engaging said plug for moving the same towards and away from the second spring support so as to vary the tension on the spring.

11. An electromagnetic device including coil means and an armature mounted in cooperative relationship thereto, and means for supporting the said armature including a frame, a torsion member anchored to a part of said frame, a plug mounted to slide in a guideway in the frame to which the other end of the torsion member is secured, and means for adjusting the plug in said guideway in the direction of the axis of the torsion member so as to vary the tension on the torsion member without applying a biasing force thereto, said means comprising a circular collar on the plug having a beveled face, facing in the direction of the frame part in which the plug is mounted to slide, a split ring mounted between said frame part and the beveled face of said collar, said split ring having a beveled face cooperating with the beveled face on the collar, and means for contracting said split ring.

12. An electromagnetic device including coil means and an armature mounted in cooperative relationship thereto, and means for supporting the said armature including a frame, a torsion strip anchored at one end to the frame, the frame having a recess therein, a plug mounted to slide in said recess, means for adjusting its position in the recess, means for anchoring the free end of the torsion strip to said plug, said torsion strip having a longitudinal slot therein, and means for supporting the armature in a transverse position passing through said slot, the slot being substantially longer than the width of the armature so as to provide two spaced longitudinal strip portions between which the armature is mounted.

13. In an electromagnetic device, a pair of yokes of magnetic material mounted in parallel spaced relationship, the ends of the limbs of the yokes constituting two pairs of spaced pole pieces, coil means for producing a variable magnetic flux through said yokes, permanent magnets mounted between said yokes, an armature having its opposite ends located between said respective pairs of pole pieces and means for pivotally mounting said armature for rotation about an axis located between said pairs of pole pieces and parallel with the axes of the limbs of said yokes.

14. In a polarized electromagnetic device, a pair of yokes of magnetic material mounted in parallel spaced relationship, the ends of the limbs of the yokes constituting two pairs of spaced pole pieces, coil means for producing a variable magnetic flux through said yokes, an armature having its opposite ends located between said respective pairs of pole pieces, means for pivotally mounting said armature for rotation about an axis located between said pairs of pole pieces and parallel with the axes of the limbs of said yokes, and a permanent magnet mounted between each pair of limbs of the yokes, said magnets being magnetized transversely so that the north pole of each magnet is adjacent to one yoke piece, and the south pole of each magnet is adjacent to the other yoke piece.

15. A polarized electromagnetic device as claimed in claim 14 in which the permanent magnets constitute the spacing means for the limbs of the yoke pieces and determine the width of the air gap between the pole pieces at the ends of said limbs.

16. In an electromagnetic device, a pair of thin permanent magnets magnetized transversely of their thickness, a pair of U-shaped yokes mounted one on each side of said permanent magnets, coil means associated with said yokes, the ends of said yokes projecting beyond the ends of the permanent magnets so as to provide spaced pole pieces, and an armature mounted for vibratory motion between said spaced pole pieces.

17. In an electromagnetic device, a pair of yokes of magnetic material mounted in spaced relationship, coils mounted on the limbs of the yokes, the ends of the limbs projecting beyond the coils and constituting two pairs of spaced pole pieces, frame members for clamping the coils and the yokes in fixed relationship, an armature carrying frame, means for removably securing the armature carrying frame to said coil supporting frame members, an armature, means for supporting said armature on said armature supporting frame for vibratory motion about an axis parallel to the axes of the limbs of the yokes, said armature being insertable into the spaces between the pole pieces when the armature carrying frame is applied to the coil supporting frames and being freely removable from its position between said pole pieces by removal of the armature supporting frame.

18. In an electromagnetic device, a pair of yokes of magnetic material mounted in spaced relationship, coils mounted on the limbs of the yokes, the ends of the limbs projecting beyond the coils and constituting two pairs of spaced pole pieces, frame members for clamping the coils and the yokes in fixed relationship, an armature carrying frame, means for removably securing the armature carrying frame to said coil supporting frame members, an armature, means for supporting said armature on said armature supporting frame for vibratory motion about an axis parallel to the axes of the limbs of the yokes, and permanent magnets clamped between the limbs of the yokes terminating short of the outer ends of the limbs constituting the pole pieces.

19. In an electromagnetic device of the character described, an armature construction comprising a pair of supports, torsion spring means attached at its ends to said supports, at least one of said supports being adjustable in the direction of the axis of the torsion spring means so as to permit vibration of the tension of said spring means, said spring means including thin resilient limb portions having a space between the same, and an armature mounted transversely between said limb portions and attached thereto intermediate said supports.

20. A high speed sensitive relay comprising electromagnetic means including pole pieces, an armature mounted for vibration between said pole pieces, a movable contact member carried by said armature, and at least one stationary contact mounted in position for engagement by said movable contact member, said stationary contact comprising a base member having an abutment surface and a spring loop having both ends secured to the base member and extending over said abutment surface, said spring loop having a contact face and a bow-shaped damping spring extending transversely of the central part of the loop and bearing at each end in frictional contact with said abutment surface, said bow shaped spring being symmetrically located with respect to the contact face so as to prevent transverse displacement of the contact face and wiping action between said face and the contact member of the armature on contact being made.

References Cited in the file of this patent

UNITED STATES PATENTS

| | | |
|---|---|---|
| 364,619 | Woods | June 7, 1887 |
| 451,414 | Storer | Apr. 28, 1891 |
| 698,027 | Knapp | Apr. 22, 1902 |
| 2,375,586 | Romer | May 8, 1945 |
| 2,412,123 | Carpenter | Dec. 3, 1946 |
| 2,423,524 | Side | July 8, 1947 |
| 2,652,464 | Vigren | Apr. 15, 1953 |
| 2,741,728 | Distin | Apr. 10, 1956 |

FOREIGN PATENTS

| | | |
|---|---|---|
| 303,717 | Germany | Feb. 13, 1918 |

UNITED STATES PATENT OFFICE
CERTIFICATE OF CORRECTION

Patent No. 2,884,498

April 28, 1959

Charles P. Fisher

It is hereby certified that error appears in the printed specification of the above numbered patent requiring correction and that the said Letters Patent should read as corrected below.

Column 5, line 20, for "effects" read -- affects --; column 10, line 28, for "vibration" read -- variation --.

Signed and sealed this 25th day of August 1959.

(SEAL)
Attest:

KARL H. AXLINE
Attesting Officer

ROBERT C. WATSON
Commissioner of Patents